United States Patent Office.

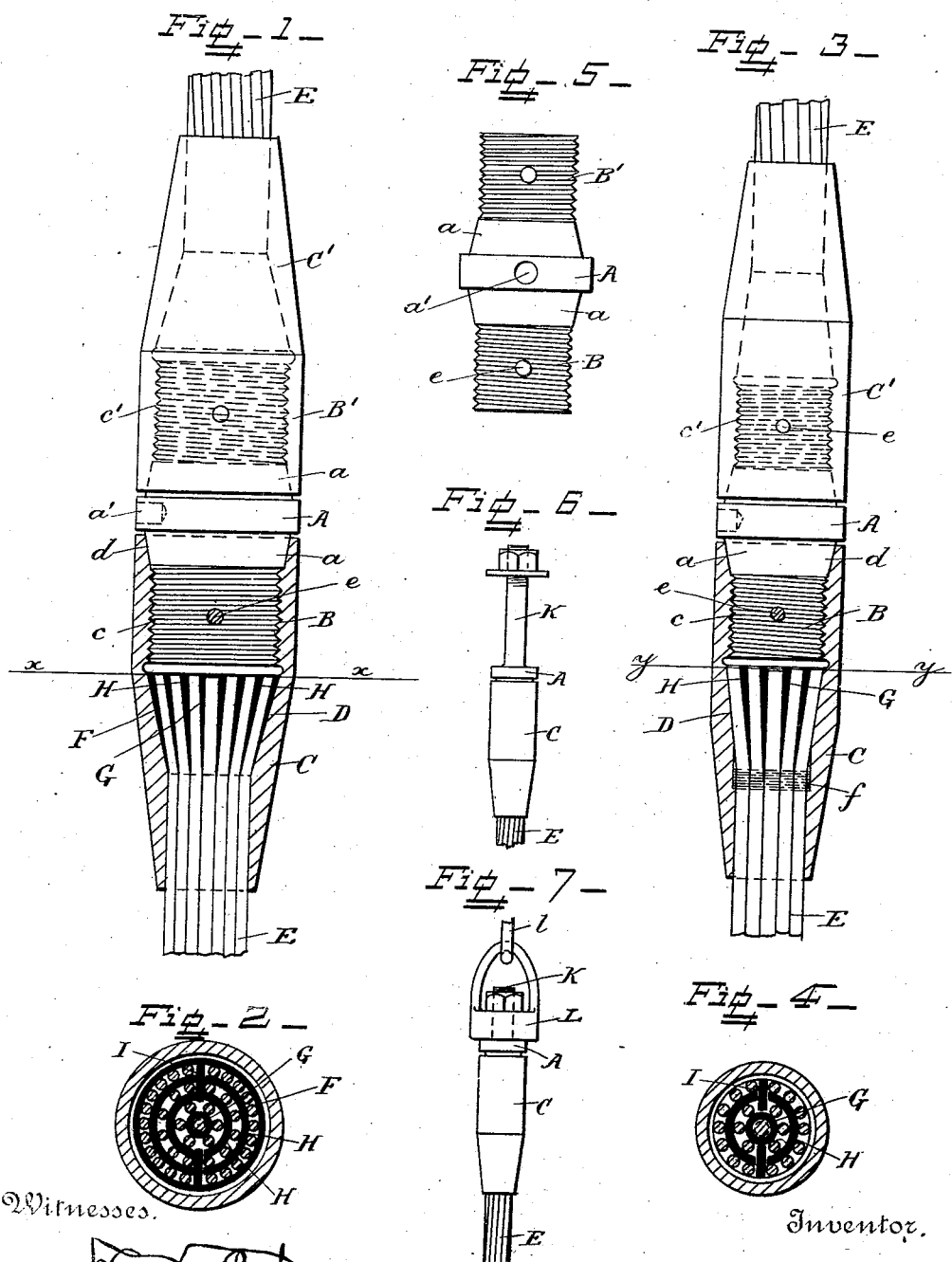

ADOLF BLEICHERT, OF GOHLIS, SAXONY, GERMANY, ASSIGNOR TO ADOLF BLEICHERT & CO., OF SAME PLACE.

COUPLING DEVICE FOR WIRE ROPES.

SPECIFICATION forming part of Letters Patent No. 380,983, dated April 10, 1888.

Application filed January 12, 1888. Serial No. 260,551. (No model.) Patented in Germany March 1, 1887, No. 41,588; in Belgium April 4, 1887, No. 76,968, and in Austria-Hungary August 16, 1887, No. 13,829 and No. 34,432.

*To all whom it may concern:*

Be it known that I, ADOLF BLEICHERT, a citizen of Germany, residing at Gohlis, in the Kingdom of Saxony, Germany, have invented certain new and useful Improvements in Coupling Devices for Wire Ropes; and I do hereby declare the following to be a full, clear, and exact description of the invention, such as will enable others skilled in the art to which it appertains to make and use the same.

This invention relates to devices for coupling together the ends of wire ropes used for drawing along a train of cars suspended from an elevated track.

This invention consists in the novel construction and combination of the parts, as hereinafter fully described and claimed.

Foreign patents have been issued for this invention as follows: Germany, No. 41,588, dated March 1, 1887; Belgium dated April 4, 1887, No. 76,968, and Austria-Hungary No. 13,829 and No. 34,432, dated August 16, 1887.

In the drawings, Figure 1 is a side view of the coupling for the meeting ends of two ropes having thirty-seven wires. Fig. 2 is a cross-section through the same, taken on the line $x$ $x$ in Fig. 1. Fig. 3 is a side view showing a modification of the coupling adapted for ropes having twenty-one wires. Fig. 4 is a cross-section taken through line $y$ $y$ in Fig. 3. Fig. 5 is a detail view of the intermediate junction-piece. Figs. 6 and 7 are side views showing the rope coupled to an anchor-bolt and to an anchor-chain, respectively.

A is the junction-piece, provided with the two tapering portions $a$, and having a hole, $a'$, for applying a wrench to hold it steady.

B and B' are right and left hand screw-threaded portions upon the ends of the junction-piece A.

C and C' are sleeves provided, respectively, with right and left hand screw-threaded portions $c$ and $c'$, engaging with said portions B and B'. Apart from this the sleeves are exactly alike, both being provided with a tapering socket, D, for the ends of the ropes and with a tapering portion, $d$, fitting the part $a$ of the junction-piece and relieving the screw-thread from lateral strain in going around curves.

E represents the ends of the wire ropes, and $e$ locking-pins, which are driven through the sleeves and the junction-piece after they are secured together to prevent them from working back.

The ends of the ropes are secured in the sleeves in the following manner: The sleeve is slid back upon the rope and the ends of the wires are cut off square. A ring is then slipped over the end of the rope. This ring may be a solid conical ring, F, as shown in Fig. 1, fitting the socket D, or it may be a ring of fine steel wire, $f$, bound around the rope, as shown in Fig. 3. A tapered ring, G, is then driven over the central wire of the rope and the end of the wire is slightly riveted over. Semicircular wedges H are then driven between the layers of wire at the end of the rope, according to the number of layers, as shown in Figs. 1 and 3, and the flat wedges I are finally driven in between the ends of the semicircular wedges. These wedges expand the end of the rope and cause it to fill the socket D when the sleeve is screwed upon the junction-piece.

In Fig. 6 the junction-piece is single-ended, and is shown provided with the anchor-bolt K, for fastening onto any solid body, and in Fig. 7 the anchor-bolt is further shown provided with the swivel L, for coupling onto the link of a chain, $l$.

What I claim is—

1. In a wire-rope coupling, the combination of a junction-piece provided with a screw-threaded portion, a sleeve provided with a tapering socket and engaging with said screw-threaded portion, the rings surrounding the end of the rope and its central wire, and the wedges inserted between the layers of wires for expanding the end of the rope within the said socket, substantially as set forth.

2. In a wire-rope coupling, the combination of a junction-piece provided with right and left hand screw-threaded portions, the two sleeves provided with tapering sockets and engaging with the said screw-threaded portions, the rings surrounding the ends of the ropes and their central wires, and the wedges inserted between the layers of wires for expanding the ends of the ropes within the said sockets of the sleeves, substantially as set forth.

3. In a wire-rope coupling, the combination of a junction-piece provided with a screw-threaded portion and the tapering portion a, a sleeve screwed upon the junction-piece and provided with a tapering socket and with a tapering portion, d, fitting said portion a and relieving the screw-thread from lateral strains, the rings surrounding the end of the rope and its central wire, and the wedges inserted between the layers of wires for expanding the rope within the said tapering socket, substantially as set forth.

4. In a wire-rope coupling, the combination of the screw-threaded junction-piece, the sleeve screwed upon the said junction-piece and provided with a tapering socket, the locking-pin passing through said sleeve and junction-piece, the rings surrounding the ends of the rope and its central wire, and the expanding wedges driven in between the layers of wires, substantially as and for the purpose set forth.

5. In a wire-rope coupling, the combination of the screw-threaded junction-piece, the sleeve screwed upon said junction-piece and provided with a tapering socket, the rings surrounding the end of the rope and its central wire, the semicircular wedges inserted between the layers of wires, and the flat wedges inserted between the ends of the semicircular wedges, whereby the end of the rope is expanded within the said socket, substantially as set forth.

6. In a wire-rope coupling, the combination of the screw-threaded junction-piece, the sleeve screwed upon said junction-piece and provided with a tapering socket, the solid conical ring surrounding the end of the rope and fitting said socket, the tapered ring driven over the central wire of the rope, the semicircular wedges inserted between the layers of wires, and the flat wedges inserted between the ends of the semicircular wedges, whereby the end of the rope is expanded within the said socket, substantially as and for the purpose set forth.

In testimony whereof I affix my signature in presence of two witnesses.

ADOLF BLEICHERT.

Witnesses:
CARL BORNGRAEBER.
ERNST SCHOLZ.